US009251028B2

(12) United States Patent
Barr et al.

(10) Patent No.: US 9,251,028 B2
(45) Date of Patent: Feb. 2, 2016

(54) MANAGING CODE INSTRUMENTATION IN A PRODUCTION COMPUTER PROGRAM (71) Applicant: INTERNATIONAL BUSINESS MACHINES CORPORATION, Armonk, NY (US)

(72) Inventors: Arthur J. Barr, Southampton (GB); Hannah J. Deakin, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/926,250

(22) Filed: Jun. 25, 2013

(65) Prior Publication Data

US 2014/0040866 A1 Feb. 6, 2014

(30) Foreign Application Priority Data

Jul. 31, 2012 (GB) .................................. 1213545.5

(51) Int. Cl.
G06F 9/44 (2006.01)
G06F 11/34 (2006.01)
G06F 11/30 (2006.01)
G06F 11/36 (2006.01)

(52) U.S. Cl.
CPC ........ *G06F 11/3409* (2013.01); *G06F 11/3093* (2013.01); *G06F 11/3644* (2013.01); *G06F 11/3676* (2013.01); *G06F 2201/865* (2013.01)

(58) Field of Classification Search
USPC ....................................................... 717/127
See application file for complete search history.

(56) References Cited

U.S. PATENT DOCUMENTS

| 7,581,209 | B2 | 8/2009 | Filho | |
|---|---|---|---|---|
| 7,747,987 | B1 | 6/2010 | Akarte et al. | |
| 7,926,042 | B2* | 4/2011 | Mehta et al. | 717/130 |
| 9,003,379 | B2* | 4/2015 | Kuzmin | 717/130 |
| 2003/0229889 | A1 | 12/2003 | Kuzmin et al. | |
| 2004/0054992 | A1* | 3/2004 | Nair et al. | 717/138 |
| 2004/0060043 | A1* | 3/2004 | Frysinger et al. | 717/158 |
| 2005/0007272 | A1* | 1/2005 | Smith et al. | 342/189 |
| 2006/0271677 | A1* | 11/2006 | Mercier | 709/224 |
| 2007/0168998 | A1* | 7/2007 | Mehta et al. | 717/130 |
| 2007/0277167 | A1* | 11/2007 | Smith et al. | 717/168 |
| 2008/0148039 | A1 | 6/2008 | Cobb et al. | |
| 2009/0249316 | A1* | 10/2009 | Cascaval et al. | 717/145 |
| 2010/0037101 | A1* | 2/2010 | Zakonov et al. | 714/38 |
| 2010/0131930 | A1 | 5/2010 | Ben-Chaim et al. | |
| 2010/0146340 | A1 | 6/2010 | Bhate et al. | |

(Continued)

OTHER PUBLICATIONS

Vetter et al, "Managing Performance Analysis with Dynamic Statistical Projection Pursuit", 1999, ACM.*

(Continued)

*Primary Examiner* — Anna Deng
*Assistant Examiner* — Junchun Wu
(74) *Attorney, Agent, or Firm* — Law Office of Jim Boice (57) ABSTRACT

A method, system, and/or computer program product manages code instrumentation in a production computer program. Performance data from instrumentation code associated with a portion of code of a production computer program is received. One or more processors compare the performance data to a predetermined performance threshold. In response to the performance data meeting the predetermined performance threshold, one or more processors remove the instrumentation code for the portion of code.

9 Claims, 5 Drawing Sheets

(56) References Cited

U.S. PATENT DOCUMENTS

| | | |
|---|---|---|
| 2011/0047532 A1 | 2/2011 | Wang |
| 2011/0115495 A1* | 5/2011 | Kunii .......................... 324/543 |
| 2011/0161486 A1* | 6/2011 | Podjarny et al. ............. 709/224 |
| 2011/0202904 A1 | 8/2011 | Raz et al. |
| 2011/0283263 A1* | 11/2011 | Gagliardi et al. ............. 717/130 |
| 2011/0283264 A1* | 11/2011 | Gagliardi ...................... 717/130 |
| 2012/0023487 A1* | 1/2012 | Letca et al. ................... 717/130 |

OTHER PUBLICATIONS

Katchabaw et al. "Policy Driven Fault management in Distributed Systems", Oct. 1996, ISSRE, pp. 236-245.*

IBM Corporation, "IBM Rational Purifyplus" IBM Corporation, 2007, pp. 1-4.

* cited by examiner

MANAGING CODE INSTRUMENTATION IN A PRODUCTION COMPUTER PROGRAM

This application is based on and claims the benefit of priority from Great Britain (UK) Patent Application 1213545.5, filed on Jul. 31, 2012, and herein incorporated by reference in its entirety.

BACKGROUND

The present invention relates to managing code instrumentation in a production computer program.

During the production of software, code coverage tools are commonly employed which make use of instrumented code to calculate the quality of testing in terms of the lines, branches or method coverage in the software that occurs when tests are run on the development software. The instrumentation of the code however comes with the added cost of extra computational cycles, and therefore has a performance reduction compared to non-instrumented code. Therefore production code released to a customer does not typically have this instrumentation code in place. However, when production software is released, the supplier may not have fully tested all of the source code. In other words production software may be released without full test coverage.

SUMMARY

A method, system, and/or computer program product manages code instrumentation in a production computer program. Performance data from instrumentation code associated with a portion of code of a production computer program is received. One or more processors compare the performance data to a predetermined performance threshold. In response to the performance data meeting the predetermined performance threshold, one or more processors remove the instrumentation code for the portion of code.

BRIEF DESCRIPTION OF THE SEVERAL VIEWS OF THE DRAWINGS

Embodiments of the invention will now be described, by way of example only, with reference to the following drawings in which.

DETAILED DESCRIPTION

One embodiment of the present invention provides a method for managing code instrumentation in a production computer program, the method comprising the steps of: receiving performance data from instrumentation code associated with a portion of code of a production computer program; comparing the performance data to a predetermined performance threshold; and removing the instrumentation code for the code portion if the performance data meets the threshold.

The instrumentation code may comprise code coverage code, the performance data may comprise code coverage data for the portion of code and the threshold may comprise a predetermined measure of code coverage. The method may comprise the steps of: determining whether or not an error has been reported for the production computer program; if an error has been reported then determining whether the code portion is affected by any fix provided for the error; if the code portion is unaffected by any the fix then comparing the performance data against a predetermined performance threshold; and removing the instrumentation code for the code portion if the performance data meets the threshold.

The instrumentation code may be arranged to provide testing of the code portion during use in the production computer program. The instrumentation code may be provided in the code portion in response to performance data for the code portion determined prior to the incorporation of the code portion into the production computer program failing to meet the threshold. The production computer program may comprise one or more further code portions without instrumentation code. In response to the performance data meeting the threshold, the instrumentation code may be removed from one or more corresponding instances of the code portion in other production computer programs.

One embodiment of the present invention provides apparatus for managing code instrumentation in a production computer program, the apparatus being operable to: receive performance data from instrumentation code associated with a portion of code of a production computer program; compare the performance data to a predetermined performance threshold; and remove the instrumentation code for the code portion if the performance data meets the threshold.

One embodiment of the present invention provides a computer program product for managing code instrumentation in a production computer program, the computer program product comprising a computer-readable storage medium having computer-readable program code embodied therewith, the computer-readable program code configured to: receive performance data from instrumentation code associated with a portion of code of a production computer program; compare the performance data to a predetermined performance threshold; and remove the instrumentation code for the code portion if the performance data meets the threshold.

Embodiments of the present invention enable testing to be continued in operational production code. Instrumentation code may be automatically removed once the associated code is judged suitably tested.

Viewed from a further aspect, the present invention provides a computer program product for managing code instrumentation in a production computer program, the computer program product comprising: a computer readable storage medium readable by a processing circuit and storing instructions for execution by the processing circuit for performing a method for performing the steps of the invention.

Viewed from a further aspect, the present invention provides a computer program stored on a computer readable medium and loadable into the internal memory of a digital computer, comprising software code portions, when said program is run on a computer, for performing the steps of the invention.

Viewed from a further aspect, the present invention provides a method substantially as described with reference to figures.

Viewed from a further aspect, the present invention provides a system substantially as described with reference to figures.

Figure 1:
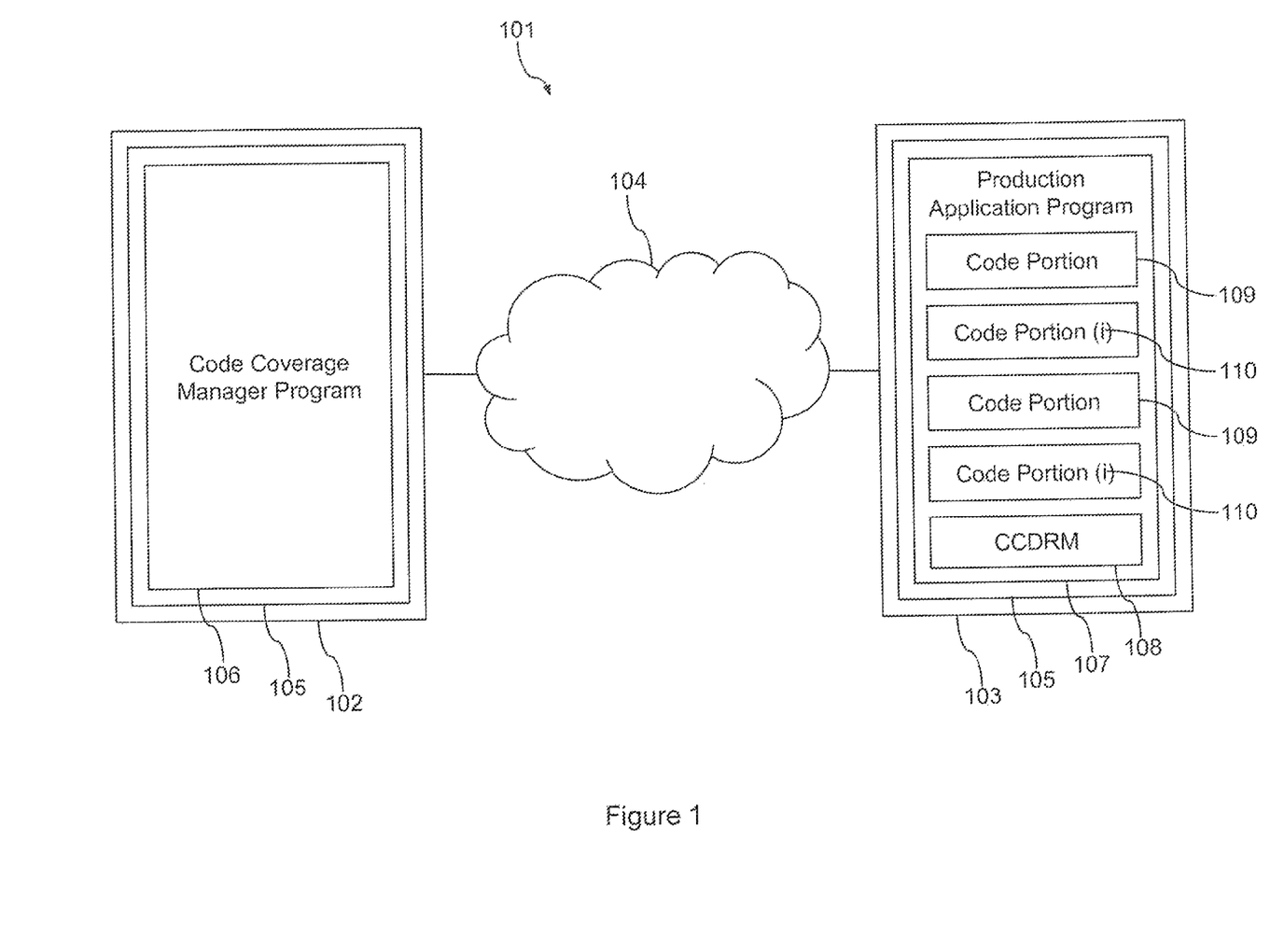
FIG. 1 is a schematic illustration of a computer system comprising a production computer program having one or more code portions associated with instrumentation code, according to one embodiment of the present invention.

With reference now to the figures, and particularly to FIG. 1, a computer system 101 comprises first and second computers 102, 103 interconnected via a network 104. Each of the computers is loaded with an operating system 105 for providing a processing platform for one or more application programs. In the present embodiment, the first computer 102 is running a code coverage manager application program 106. The second computer 103 is running a production application program 107, which comprises a code coverage data reporting module (CCDRM) 108. The production application program 107 comprises a plurality of code portions 109 and one or more of the code portions 109 are associated with instrumentation code 110. In the present embodiment, the instrumentation code 110 is integrated with the respective code portion 109 and arranged to provide performance data in the form of code coverage data for the code portion 109. As each instrumented code portion 109 is run during the operation of the production application program 107 the respective instrumentation code 110 is arranged to produce the relevant instrumentation data in the form of code coverage data. In the present embodiment, CCDRM 108 is arranged to collect the code coverage data created by the instrumentation code 110 and periodically report the code coverage data to the code coverage manager program 106 on the first computer 102.

Figure 2:
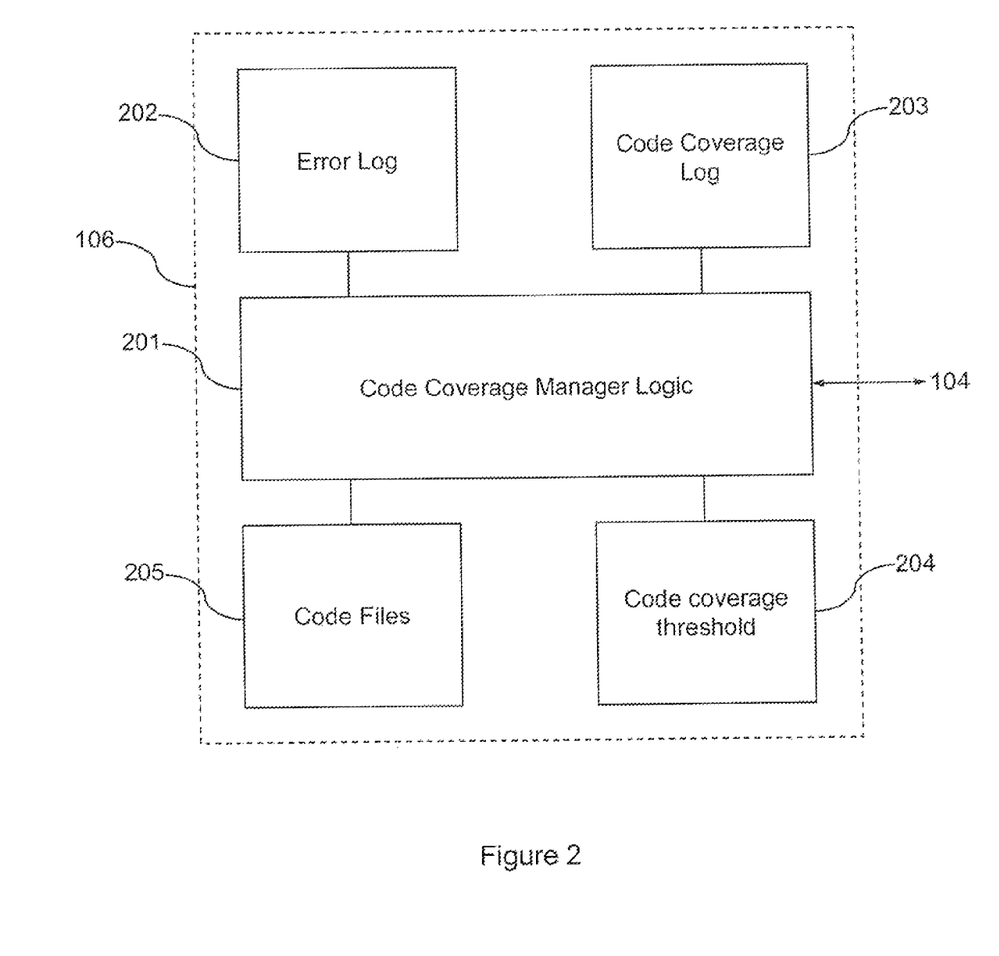
FIG. 2 is a schematic illustration of a code coverage manager program of FIG. 1, according to another embodiment of the present invention.

With reference to FIG. 2, the code coverage manager program 106 comprises code coverage management logic 201, an error log 202, a code coverage log 203, a performance threshold in the form of a code coverage threshold 204 and program code files 205. The error log 202 comprises a log of any errors that have been notified for the production application program 107. The code coverage log comprises a log of the code coverage data received from the CCDRM 108. The code coverage threshold 204 comprises a predetermined measure of code coverage for any given code portion 109. In the present embodiment, the measure of code coverage comprises the number of times a given code portion 109 is run or processed in the operation of the production application program 107. In the present embodiment, the code coverage threshold 204 is set at three. In other words, the code coverage threshold 204 is met when a given code portion 109 has been run or processed three or more times. The code files 205 comprise copies of the production code files for the production application program 107. Some of the code files 205 include code coverage instrumentation code 110. Others of the code files 205 comprise no code coverage instrumentation code 110. In the present embodiment, the code files 205 are provided to the code coverage manager program 106 on deployment of the production application program 107. It will be appreciated that code coverage threshold 204 could be set a different values other than three.

The code coverage manager logic 201 is configured to respond to code coverage data received periodically from the CCDRM 108 by logging the code coverage data in the log 203 and then comparing the code coverage data received for each relevant code portion 109 to the code coverage threshold 204. If the threshold 204 is met then the code coverage manager logic 201 is arranged to modify the relevant code portion 109 by removing the instrumentation code 110. The code coverage manager logic 201 is configured then to issue a patch for the production application program 107 comprising the de-instrumented code portion 109. In the present embodiment, the patch comprises an updated version of the relevant code file 205 containing the de-instrumented code portion 109.

The code coverage manager logic 201 is further arranged, in response to the receipt of code coverage data from the CCDRM 108, to determine whether any errors are logged in the error log 202 for the production application program 107. If one or more errors have been logged then the code coverage manager logic 201 is arranged to await a fix for the error. In response to the fix being provided, the code coverage manager logic 201 is arranged to identify the code portions 109 unaffected by the fix and to check the relevant code coverage data for those unaffected portions 109 against the code coverage threshold and to produce patches as appropriate.

In the present embodiment, the production application program 107 is created in a software development process in which development code is written, instrumented and extensively tested. On completion of testing, the code portions in the development code that are judged as having been adequately covered by the testing have their associated instrumentation code removed. Those code portions that are judged as not having been adequately covered or not covered at all by the testing retain their instrumentation code. The production code is then produced from the development code resulting in the production application program 107 comprising one or more code portions 109 containing instrumentation code 110 and the CCDRM 108. As noted above, the files 205 for the deployed production application program 107 are made available to the code coverage manager program 106.

Figure 3:
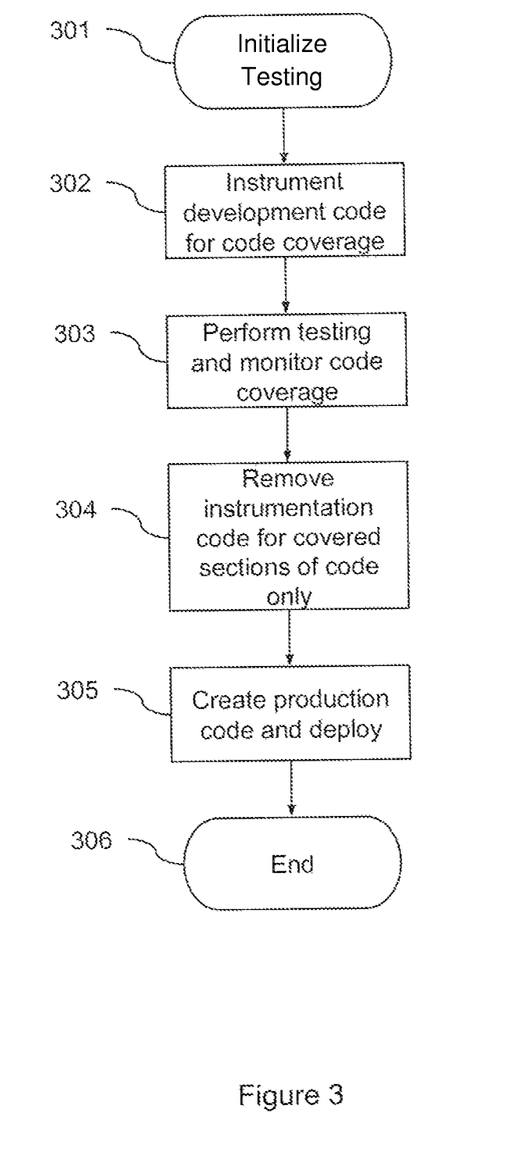
FIG. 3 is a flow chart illustrating the deployment of the computer program of FIG. 1, according to another embodiment of the present invention.

The testing and deployment process for the production application program 107 will now be described with reference to the flow chart of FIG. 3. At step 301 testing of the development code for the application program 107 is initiated and the process moves to step 302. At step 302 the development code is instrumented for so as to produce code coverage data and the process moves to step 303. At step 303 testing is performed on the instrumented development code, the resulting code coverage data collected and the process then moves to step 304. At step 304 the instrumentation is removed from the sufficiently covered portions of code and the process moves to step 305. At step 305 the production code is created from the partially de-instrumented development code and the CCDRM 108 inserted before the production application program 107 is deployed and a copy of the relevant files 205 provided for access by the code coverage manager program 106. The process then ends at step 306.

Figure 4:
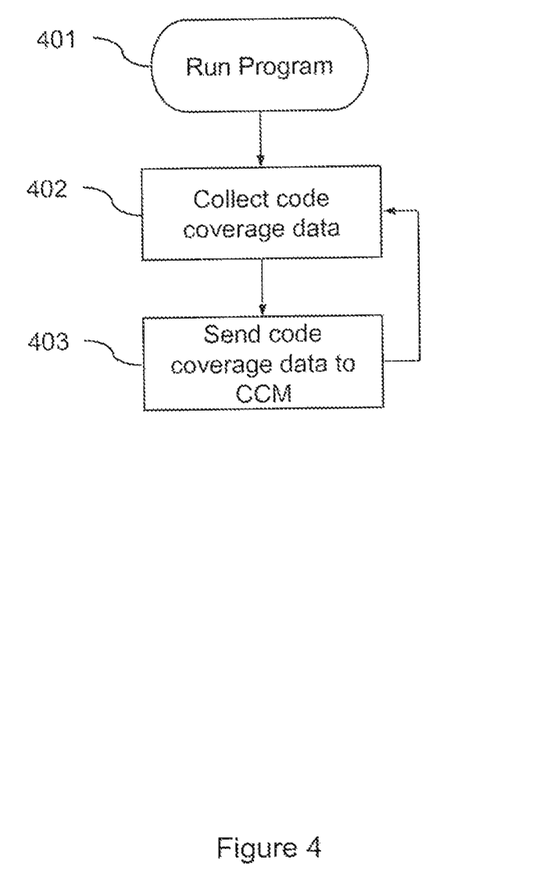
FIG. 4 is a flow chart illustrating the processing performed by a code coverage data reporting module associated with the computer program of FIG. 1, according to one embodiment of the present invention.

The processing performed by the CCDRM 108 will now be described with reference to the flowchart of FIG. 4. Processing initiated at step 401 in response to the running of the production application program 107 and processing moves to step 402. At step 402 code coverage data is collected from the instrumentation code 110 for a predetermined period at which point processing moves to step 403. At step 403 the collected code coverage data is sent to the code coverage manager program 106 and processing returns to step 402 and continues reporting code coverage data as described above as long as the production application program 107 runs.

Figure 5:
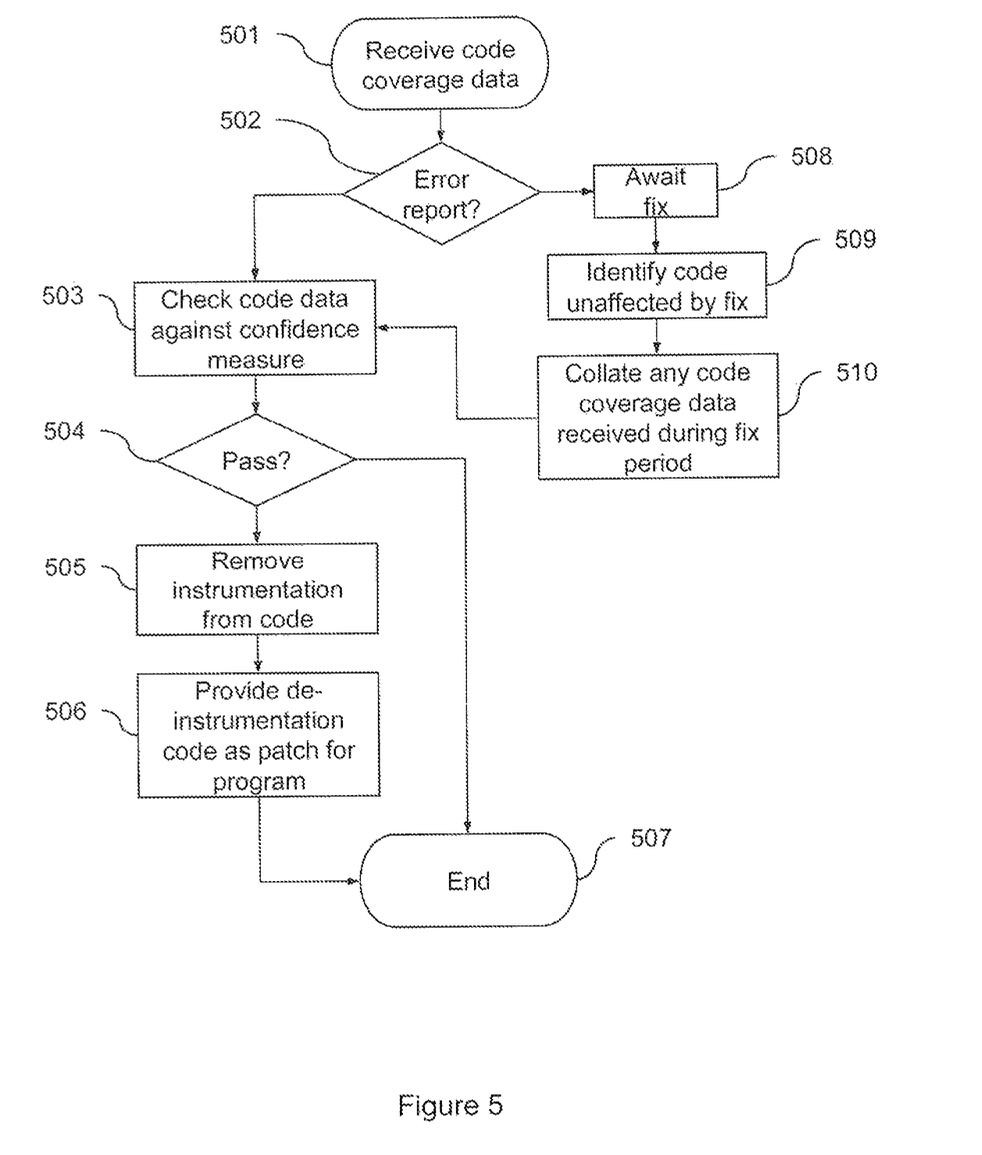
FIG. 5 is a flow chart illustrating the processing performed by the code coverage manager program of FIG. 2 in response to the receipt of code coverage data from the instrumentation code associated with the computer program of FIG. 1, according to another embodiment of the present invention.

The processing performed by the code coverage manager program 106 in response to the receipt of code coverage data from the CCDRM 108 will now be described with reference to the flow chart of FIG. 5. Processing is initiated in response to the receipt of code coverage data from the CCDRM 108 which is logged in the code coverage log 203 and processing moves to step 502. At step 502 the error log 202 is checked to determine whether any errors have been reported and recorded for the production application program 107 and which remain unresolved. If no such errors are identified then processing moves to step 503. At step 503 the logged code coverage data for each relevant instrumented code portion 109 is checked against the code coverage threshold 204 and processing moves to step 504. At step 504 if the code coverage data meets the threshold, that is, in the present embodiment, the code coverage data indicates that the relevant code portion 109 has been processed three or more times, then processing moves to step 505. At step 505 the instrumentation code 110 is removed from all code portions 109 for which the associated code coverage data meets the threshold 204 and processing moves to step 506. If at step 505 all instrumentation code has been removed from all the files of the production application program 107 then the CCDRM 108 is also removed. At step 506 the relevant code files 205 comprising the de-instrumented code portions 109 are provided as a patch for the production application program 107. Processing then moves to step 507 and ends. If at step 504 the code coverage data for a given code portion 109 does not meet the threshold 204 then processing for the given code portion 109 moves to step 507 and ends.

If at step 502 one or more errors are identified in the errors log 202 then processing moves to step 508. At step 508 processing awaits an input indicating that the errors have been fixed and processing moves to step 509. At step 509 the code portions 109 unaffected by the code changes implemented to fix the errors are identified and processing moves to step 510. At step 510 the code coverage data received during the error fix period is collated with the logged code coverage data for all of the unaffected code portions 109 and processing moves to step 503 where the unaffected code portions 109 are processed as described above.

In another embodiment the code coverage manager program is arranged to wait for all instrumented code in a given file to be removed before issuing a patch comprising the entire file with all instrumentation removed.

In a further embodiment if an error is identified as logged then, once the error is cleared, only the unaffected files are assessed against the received or logged code coverage data.

In another embodiment, one or more files comprise a single code portion. In other words, code files and code portions are synonymous.

In a further embodiment, code coverage data is received from more than one production application program each having a corresponding CCDRM collecting the code coverage data. In this embodiment, the code coverage data may be treated separately for each production application program from which it originates and instrumentation code is removed only from corresponding production application programs. In another embodiment, the code coverage data from a plurality of production application programs is collected and pooled and, if the code coverage threshold is met by the pooled data then instrumentation code is removed from one or more of the production application programs.

As will be understood by those skilled in the art, any suitable type of testing and corresponding instrumentation code and threshold may be applied to embodiments of the invention.

As will be understood by those skilled in the art, in some embodiments, instrumentation code may be removed from the development code prior to the creation of the production code so as to leave some instrumentation code present in the production code. In other embodiments, instrumentation code may be added to the development code prior to the creation of the production code so as to add instrumentation code present in the production code. Such added instrumentation code may be provided in addition to instrumentation code already present.

Embodiments of the invention enable testing to be continued in operational production code. Testing instrumentation may be automatically removed once the associated code is deemed suitably tested.

It will be understood by those skilled in the art that the apparatus that embodies a part or all of the present invention may be a general purpose device having software arranged to provide a part or all of an embodiment of the invention. The device could be a single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details of the representative apparatus and method, and illustrative examples shown and described. Accordingly, departures may be made from such details without departure from the scope of applicant's general inventive concept.

As will be appreciated by one skilled in the art, aspects of the present invention may be embodied as a system, method, computer program product or computer program. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Java and all Java-based trademarks and logos are trademarks or registered trademarks of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

For the avoidance of doubt, the term "comprising", as used herein throughout the description and claims is not to be construed as meaning "consisting only of".

What is claimed is:

1. A method for managing code instrumentation in a production computer program, said method comprising:

receiving, by a first computer, performance data from instrumentation code associated with a portion of code of a production computer program that is running in a second computer, wherein said instrumentation code comprises multiple code portions of instrumentation code, wherein said instrumentation code comprises code coverage code, wherein said performance data comprises code coverage data for said portion of code, wherein said code coverage data describes a quantity of times that the portion of code is executed and evaluated by the instrumentation code, wherein a predetermined performance threshold comprises a predetermined measure of code coverage, wherein said instrumentation code is provided in said portion of code in response to the performance data for said portion of code failing to meet a predetermined performance threshold, wherein said performance data is determined prior to an incorporation of said portion of code into said production computer program, and wherein said performance data is collected by a code coverage data reporting module (CCDRM) in the second computer;

pooling, by one or more processors, the code coverage data from multiple production computer programs;

comparing, by one or more processors, said performance data to said predetermined performance threshold, wherein the performance data describes a quantity of times that the portion of code is executed in the multiple production computer programs;

in response to said performance data meeting said predetermined performance threshold, removing, by one or more processors, said multiple code portions of instrumentation code from said portion of code in the multiple production computer programs;

determining, by one or more processors, whether or not an error has been reported for said production computer program;

in response to an error being reported for said production computer program, determining, by one or more processors, whether said portion of code is affected by a fix provided for said error;

identifying, by one or more processors, code portions in the production computer program that are unaffected by the fix;

in response to said portion of code being unaffected by said fix, comparing, by one or more processors, said performance data against the predetermined performance threshold;

in response to said performance data meeting said predetermined performance threshold, removing, by one or more processors, said instrumentation code for said portion of code;

in response to said performance data meeting said predetermined performance threshold, removing, by one or more processors, said instrumentation code and said CCDRM from one or more corresponding instances of said portion of code in other production computer programs; and in response to all instances of instrumentation code being removed from the production computer program, issuing a patch that is made up of the production computer program with all instances of the instrumentation code removed.

2. The method of claim 1, wherein said instrumentation code is arranged to provide testing of said portion of code during use in said production computer program.

3. The method of claim 1, where said production computer program comprises one or more further portion of codes without instrumentation code.

4. A computer program product for managing code instrumentation in a production computer program, the computer program product comprising a non-transitory tangible computer readable storage medium having program code embodied therewith, the program code readable and executable by a processor to perform a method comprising:

receiving performance data from instrumentation code associated with a portion of code of a production computer program that is running in a second computer, wherein said instrumentation code comprises multiple code portions of instrumentation code, wherein said instrumentation code comprises code coverage code, wherein said performance data comprises code coverage data for said portion of code, wherein said code coverage data describes a quantity of times that the portion of code is executed and evaluated by the instrumentation code, wherein a predetermined performance threshold comprises a predetermined measure of code coverage, wherein said instrumentation code is provided in said portion of code in response to the performance data for said portion of code failing to meet a predetermined performance threshold, wherein said performance data is determined prior to an incorporation of said portion of code into said production computer program, and wherein said performance data is collected by a code coverage data reporting module (CCDRM) in the second computer;

pooling the code coverage data from multiple production computer programs;

comparing said performance data to said predetermined performance threshold, wherein the performance data describes a quantity of times that the portion of code is executed in the multiple production computer programs;

in response to said performance data meeting said predetermined performance threshold, removing said multiple code portions of instrumentation code from said portion of code in the multiple production computer programs;

determining whether or not an error has been reported for said production computer program;

in response to an error being reported for said production computer program, determining whether said portion of code is affected by a fix provided for said error;

identifying code portions in the production computer program that are unaffected by the fix;

in response to said portion of code being unaffected by said fix, comparing said performance data against the predetermined performance threshold;

in response to said performance data meeting said predetermined performance threshold, removing said instrumentation code for said portion of code;

in response to said performance data meeting said predetermined performance threshold, removing said instrumentation code and said CCDRM from one or more corresponding instances of said portion of code in other production computer programs; and in response to all instances of instrumentation code being removed from the production computer program, issuing a patch that is made up of the production computer program with all instances of the instrumentation code removed.

5. The computer program product of claim 4, wherein said instrumentation code is arranged to provide testing of said portion of code during use in said production computer program.

6. The computer program product of claim 4, where said production computer program comprises one or more further portion of codes without instrumentation code.

7. A computer system comprising:

a processor, a computer readable memory, and a computer readable storage medium; first program instructions to receive performance data from instrumentation code associated with a portion of code of a production computer program that is running in a second computer, wherein said instrumentation code comprises multiple code portions of instrumentation code, wherein said instrumentation code comprises code coverage code, wherein said performance data comprises code coverage data for said portion of code, wherein said code coverage data describes a quantity of times that the portion of code is executed and evaluated by the instrumentation code, wherein a predetermined performance threshold comprises a predetermined measure of code coverage, wherein said instrumentation code is provided in said portion of code in response to the performance data for said portion of code failing to meet a predetermined performance threshold, wherein said performance data is determined prior to an incorporation of said portion of code into said production computer program, and wherein said performance data is collected by a code coverage data reporting module (CCDRM) in the second computer;

second program instructions to pool the code coverage data from multiple production computer programs;

third program instructions to compare said performance data to said predetermined performance threshold, wherein the performance data describes a quantity of times that the portion of code is executed in the multiple production computer programs;

fourth program instructions to, in response to said performance data meeting said predetermined performance threshold, remove said multiple code portions of instrumentation code from said portion of code in the multiple production computer programs;

fifth program instructions to determine whether or not an error has been reported for said production computer program;

sixth program instructions to, in response to an error being reported for said production computer program, determine whether said portion of code is affected by a fix provided for said error;

seventh program instructions to identify code portions in the production computer program that are unaffected by the fix;

eighth program instructions to, in response to said portion of code being unaffected by said fix, compare said performance data against the predetermined performance threshold;

ninth program instructions to, in response to said performance data meeting said predetermined performance threshold, remove said instrumentation code for said portion of code;

tenth program instructions to, in response to said performance data meeting said predetermined performance threshold, remove said instrumentation code and said CCDRM from one or more corresponding instances of said portion of code in other production computer programs; and eleventh program instructions to, in response to all instances of instrumentation code being removed from the production computer program, issue a patch that is made up of the production computer program with all instances of the instrumentation code removed; and wherein the first, second, third, fourth, fifth, sixth, seventh, eighth, ninth, tenth, and eleventh program instructions are stored on the computer readable storage medium for execution by the processor via the computer readable memory.

8. The computer system of claim 7, wherein said instrumentation code comprises code coverage code, said performance data comprises code coverage data for said portion of code, and said predetermined performance threshold comprises a predetermined measure of code coverage.

9. The computer system of claim 7, where said production computer program comprises one or more further portion of codes without instrumentation code.

* * * * *